Aug. 18, 1931.    E. JAMES    1,819,175
FLEXIBLE CONDUIT AND METHOD OF MAKING THE SAME
Filed Nov. 20, 1926

INVENTOR
Edward James
BY
Richey & Watts
ATTORNEYS

Patented Aug. 18, 1931

1,819,175

UNITED STATES PATENT OFFICE

EDWARD JAMES, OF CLEVELAND, OHIO, ASSIGNOR, BY MESNE ASSIGNMENTS, TO HAROLD ELNO SMITH, OF CLEVELAND HEIGHTS, OHIO

FLEXIBLE CONDUIT AND METHOD OF MAKING THE SAME

Application filed November 20, 1926. Serial No. 149,572.

This invention relates to flexible conduit and to a method of making the same. It is particularly concerned with flexible, fluid-confining conduit formed in part from more or less rigid tubing.

Heretofore flexible conduit has been made from material of relatively little stiffness, such as cloth, so that it could bend laterally, and was provided with coiled wire or the like, as a support for the walls against collapse. Since the flexibility of such devices depended on the inherent flexibility of the tubing, only the thinner or more flexible materials could be employed and stiff fiber tubes were totally unsuited for the purpose. The conduit made of such materials did not possess the necessary rigidity to resist creasing, kinking, flattening or other deforming tendencies and the coiled wire helped the tube to resist such deforming forces only by absorbing some of the forces itself. Moreover, the coiled wire did not uniformly distribute stresses in the conduit, but often localized the stresses with the result that the life of the conduit was quite short.

I have discovered, however, that extremely flexible, fluid-confining conduit can be made from stiff tubing of thick, hard fiber, metal or vulcanized fibrous material. The inherent rigidity of such tubing effectively resists deforming stresses and prevents the tubing from being creased, kinked or flattened. The conduit is surprisingly flexible and possesses unusually long life both due, I believe, largely to the cooperating relationship existing between the tube and coiled member or members in devices of my invention.

My invention may be well understood from a description of a device embodying it and a method of making such a device. Briefly, such a device comprises a tube of fluid-confining material spirally corrugated and having one or more coiled members assembled with the corrugations of the tube in such manner and condition that a relatively powerful force as compared with the expansive tendency of the tube is exerted, thereby causing axial contraction of the conduit. A single coiled member may be used when the tubing is sufficiently rigid or stiff to retain it in place with the corrugations, but when one or more coiled members are employed on each side of the tubing, more flexible tubing material, even cloth, can be used. The coils may be composed of spring wire, fiber and similar material having close coiled convolutions initially, and possessing sufficient resiliency to tend to return with force to its initial position and form when distorted, as for example when the coil is expanded axially and the convolutions separated.

The method comprises briefly the provision of a tube of fluid-confining material in which, if made by winding sheet material about a form, the material preferably is wound with its ends substantially parallel with the axis of the tube or straight as contrasted with curving spirally about the tube. One or more short coiled members are provided, the convolutions of each member being normally in substantial contact with each other. The outside diameter of the member which is to go inside the tube should be only slightly less than the inside diameter of the tube while the inside diameter of the member to go outside of the tubes should be somewhat less than the outside diameter of the tube. I prefer to select coiled members of sufficient stiffness, resiliency or axially contractile strength to control the action of the tubing and to contract the same axially. Of course, the size of or material constituting such members should be varied in accordance with the size and nature of material constituting the tubing so as to afford the desired action. A length of suitable tubing somewhat longer than the final desired length is then assembled with one or more shorter coiled members which, for example, need not exceed about one-eighth of the length of the tubing. When the conduit is to have an inside coiled member, the latter may be placed in one end of the tubing and secured thereto and then the tube may be corrugated spirally. When this corrugating begins near or at the end thereof and over the inner coil and progresses toward the other end, the tubing is progressively forced down between the convolutions of the coiled member and the coiled member is thereby expanded axially to approximately the length of the tube when corrugated and tensioned. The tube may also be corrugated as a whole by first stretching the coil and then forming the corrugations by suction within or pressure outside of the tube. When the conduit is to have a coiled member on its exterior, a coiled member of the foregoing described properties and of a suitable short length is secured in places on one end of the tube and is placed about the tube progressively from one end of the tube to the other immediately following the formation of the corrugations therein, the convolutions being separated only as fast as they are placed on the tube. Obviously two or more coiled members can thus be assembled with a tube in one complete operation. It is also obvious that one coiled member may be much stiffer than the other if desired since the contractile actions are additive and opposite to the normal tendency of the tube to expand axially after being corrugated. Such contractile forces act to control the movement of the tube and tend to preserve a bellows like formation of the tube which is conducive to great flexibility even with normally inflexible tube materials.

My invention may also be carried out in combination with flexible metal tubing where the metal tubing is placed within a fiber tube, which is corrugated and has a contractile coiled member placed outside the tube in the corrugations. The tube serves to confine fluids without requiring the expensive packing in the metal tube common at present and prevents the normal twisting tendency of the metal tubing and the coiled member insures permanent assembly of the parts and increases the flexibility of the complete device.

Other advantages of my invention will become apparent as the following description of several embodiments thereof progresses, reference being made to the accompanying drawings in which like reference characters are employed to designate like parts throughout the same.

Figure 1:
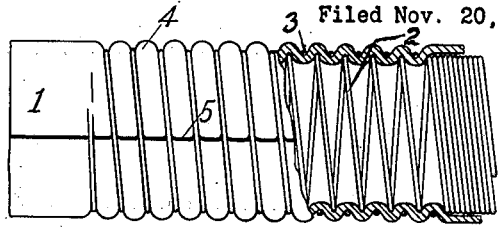
Fig. 1 is an elevation partly in section of a portion of a conduit forming one embodiment of my invention.
Figure 2:
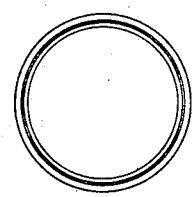
Fig. 2 is an end view of the same.

Referring now more particularly to Figs. 1 and 2, which illustrate one embodiment of my invention, I provide an inner normally closed coil 2 of spring wire and a similar outer normally closed coil spring 3. Interposed between these coils is a tube 1 of fiber material corrugated as at 4, substantially throughout its length. The tube is formed of sheet material with the ends extending parallel to the longitudinal axis of the tube, as shown at 5. The outer coil 3 is initially of lesser diameter than the outside diameter of the tube 1, so that it exerts a radially contracting force on the tube when corrugated. The inner coil 2 is almost as large in diameter initially as the interior of the tube before it is corrugated.

Figure 3:
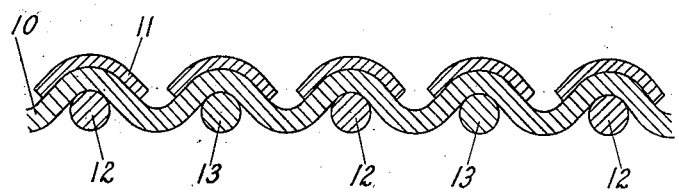
Fig. 3 is an enlarged fragmentary section of a form of conduit comprising another embodiment of my invention.

In Fig. 3 I have illustrated a second embodiment of my invention, which comprises a corrugated tube 10 of suitable material, having an outer normally closed coil 11, and inner normally closed coils 12 and 13. The outer coil is formed of a strip of flexible fiber material having considerable rigidity and contractile strength. This strip is preferably bowed or rolled into concavo-convex cross section, so that when applied to the corrugations of the tube, its concave surface will conform to the contour of the corrugations, the edges of the strip extending well down into the depressions between the corrugations. It will be noted in connection with this embodiment that I provide two coil springs in extended position within the tube 10, the convolutions of these coils being seated alternately in depressions in tube 10.

Figure 4:
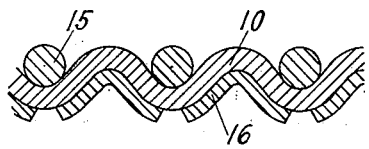
Fig. 4 is an enlarged fragmentary view of a third embodiment of my invention.

In Fig. 4 which illustrates another embodiment of my invention, I provide an outer normally closed coil spring 15, and an inner normally closed coil member 16 composed of a strip of material such as fibre, the strip being formed as shown in the figure to conform to the walls of the depressions on the interior of the tube. The longitudinal edges of the convolutions forming the inner coil extend well up onto the apices of the corrugations in the tube 10, thus protecting the latter from wear.

Figure 5:
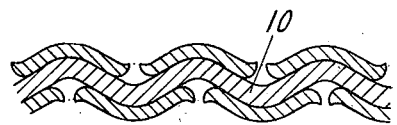
Fig. 5 is an enlarged fragmentary view of a fourth embodiment of my invention.

In Fig. 5 I have illustrated another embodiment of my invention, in which I have shown inner and outer normally closed coils formed of a strip of suitable material, such as metal or fibre, the cross sections of either strip being concavo-convex, the concave surfaces of the strips being shaped to conform to the contour of the apices or peaks of the respective corrugations of the tube 10, on which they are to seat and with slightly rounded edges to prevent wear on the tube.

Figure 6:
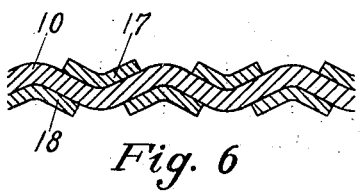
Fig. 6 is an enlarged fragmentary view of a fifth embodiment of my invention.

In Fig. 6 I have illustrated another embodiment of my invention, which is similar to that form shown in Fig. 5, with the exception that the convolutions of the respective inner and outer coils 17 and 18 are seated in the depressions of the corrugations of the tube 10.

Figure 7:
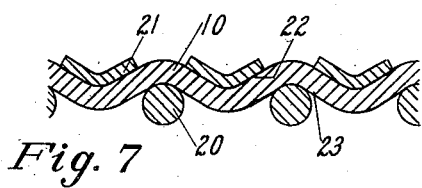
Fig. 7 is an enlarged fragmentary section of tubing comprising the sixth embodiment of my invention.

In Fig. 7 I have illustrated still another embodiment of my invention, in which the corrugated tube 10 is provided with inner and outer coils 20 and 21, respectively, the inner coil comprising a normally closed metal spring and the outer coil comprising a strip of flexible fibrous material of concavo-convex cross section.

Figure 8:
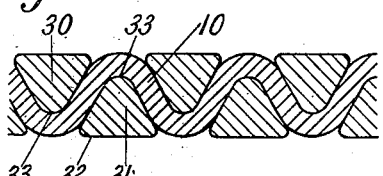
Fig. 8 is an enlarged fragmentary section of tubing.

In Fig. 8 I have illustrated still another embodiment of my invention which consists in providing a corrugated tube 10 as hereinbefore described with coils 30 and 31 substantially triangular in cross section with the bases of the said coils forming a substantially smooth cylindrical surface on the respective inner and outer walls of the conduit, when the coils are in assembled positions. The apex of each cross section of either the inner or outer coils is preferably rounded as at 33 to support the tubing without cutting the same.

Figure 9:
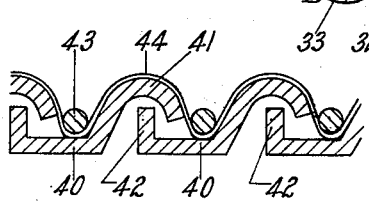
Fig. 9 is an enlarged fragmentary section of another embodiment of my invention.

In Fig. 9 I have illustrated another embodiment of my invention which consists in applying a normally closed spring 43 to the convolutions of a fiber tube 44 surrounding a flexible metal tube of the interlocking type that is a tube composed of a spirally wound metal strip whose adjacent convolutions interlock. In this embodiment of my invention, the conduit may be constructed of any suitable form of interlocking convolutions, one type of which is shown in Fig. 9, as consisting of an arched portion 41 of each convolution overlapping and interlocking with an upwardly extending portion 42 of the next succeeding convolution. A normally closed coil spring 43 is extended and its convolutions disposed between the arched portions of respective adjacent interlocking sections 40. The corrugated tube 44 flexibly seals the joints between the relatively movable interlocking sections, and thus obviates any packing in the metal tubing for confining fluid.

Various other changes may be made in the details of construction of my invention without departing from the spirit thereof or the scope of the appended claims.

What is claimed is:

1. A flexible conduit comprising a spirally corrugated tube, and an axially tensioned tube-controlling coil operatively associated with the corrugations of the tube.

2. A flexible conduit comprising a tube spirally corrugated and having a tendency to expand axially said tube being relatively rigid if uncorrugated, and an axially tensioned coil operatively associated with the corrugations of the tube, the said coil having a greater tendency to contract than the tendency of the tube to expand axially.

3. A flexible conduit comprising a tube corrugated spirally and a coiled member disposed therewithin, the convolutions of the coil being separated by the corrugations of the tube and the coil being maintained in a condition of axial tension.

4. A flexible conduit comprising a fluid-tight tube corrugated spirally, and a coiled member operatively associated with the corrugations of the tube, the said coiled member having its convolutions spaced apart and being axially tensioned.

5. A flexible conduit comprising a tube spirally corrugated and a plurality of coiled members disposed within and without the said tube and operatively associated with the said corrugations, the said coiled members having their convolutions spaced apart and being tensioned axially by the corrugations of the tube.

6. A tube of spirally corrugated material, said tube being normally rigid if uncorrugated, and a helical coil of spring wire having its convolutions located in such corrugations and tensioned against the walls thereof both radially and longitudinally whereby said tube is rendered flexible.

7. A conduit comprising a spirally corrugated tube, said tube being relatively rigid if uncorrugated, and a plurality of yielding members disposed within said tube and operatively associated and held apart and axially and radially tensioned by said corrugations.

In testimony whereof I hereunto affix my signature this 18th day of November, 1926.

EDWARD JAMES.